United States Patent
Odillard et al.

(10) Patent No.: US 9,897,384 B2
(45) Date of Patent: Feb. 20, 2018

(54) HEAT EXCHANGER, ESPECIALLY FOR A MOTOR VEHICLE, AND CORRESPONDING AIR INTAKE DEVICE

(75) Inventors: Laurent Odillard, Le Luart (FR); Sebastien Devedeux, Versailles (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 833 days.

(21) Appl. No.: 14/122,457

(22) PCT Filed: May 21, 2012

(86) PCT No.: PCT/EP2012/002160
§ 371 (c)(1),
(2), (4) Date: Jan. 29, 2014

(87) PCT Pub. No.: WO2012/159730
PCT Pub. Date: Nov. 29, 2012

(65) Prior Publication Data
US 2014/0138071 A1     May 22, 2014

(30) Foreign Application Priority Data

May 26, 2011   (FR) ...................................... 11 54578

(51) Int. Cl.
   *F28D 7/02*       (2006.01)
   *F28D 7/00*       (2006.01)
   (Continued)

(52) U.S. Cl.
   CPC ............ *F28D 7/00* (2013.01); *F02B 29/0475* (2013.01); *F02M 35/112* (2013.01); *F28F 9/001* (2013.01);
   (Continued)

(58) Field of Classification Search
CPC .... F28D 7/00; F28D 2021/0082; F28F 9/001; F28F 9/005; F28F 2280/02;
(Continued)

(56) References Cited

U.S. PATENT DOCUMENTS 2,843,367 A * 7/1958 Bogus ................. F02B 29/0462
                                                      165/139
4,474,162 A * 10/1984 Mason ................ F02B 29/0456
                                                      123/542
(Continued)

FOREIGN PATENT DOCUMENTS

DE       EP 0578916 A2 * 1/1994 ........... F28D 7/1684
DE       102005050738 A1    4/2007
(Continued)

OTHER PUBLICATIONS

English language abstract and machine assisted translation for DE 102005050738 extracted from espacenet.com database on May 5, 2014, 12 pages.

(Continued)

*Primary Examiner* — Claire Rojohn, III
(74) *Attorney, Agent, or Firm* — Howard & Howard Attorneys PLLC

(57) ABSTRACT

A heat exchanger for heat exchange between at least two fluids, especially for a motor vehicle, comprises a bundle (7) for heat exchange between said fluids, and a housing (9) for receiving said bundle (7), said housing (9) having at least one raised edge (11). The heat exchanger also has a seal (15) of a rigid plastic material, said seal enveloping said at least one raised edge (11) and being designed to ensure the tightness between the exchanger and a container of said exchanger. The heat exchanger can also be included in an air intake device including such a heat exchanger and an air intake collector.

10 Claims, 2 Drawing Sheets

(51) Int. Cl.
*F02M 35/112* (2006.01)
*F28F 9/00* (2006.01)
*F02B 29/04* (2006.01)
*F28D 21/00* (2006.01)

(52) U.S. Cl.
CPC .......... *F28F 9/005* (2013.01); *F02B 29/0462* (2013.01); *F28D 2021/0082* (2013.01); *F28F 2230/00* (2013.01); *F28F 2275/085* (2013.01); *F28F 2280/02* (2013.01); *Y02T 10/146* (2013.01)

(58) Field of Classification Search
CPC ............ F28F 2230/00; F28F 2275/085; F02M 35/112; F02B 29/0475; F02B 29/0462; Y02T 10/146
USPC .............................. 165/41, 44, 149, 158, 164
See application file for complete search history.

(56) References Cited

U.S. PATENT DOCUMENTS

| | | | |
|---|---|---|---|
| 6,283,199 | B1 | 9/2001 | Nakamura et al. |
| 7,571,718 | B2 | 8/2009 | Hendrix et al. |
| 7,661,415 | B2 | 2/2010 | Nakamura |
| 8,651,092 | B2 | 2/2014 | Ghiani |
| 8,695,574 | B2 | 4/2014 | Nguyen |
| 8,708,036 | B2 | 4/2014 | Ikeda |
| 8,720,199 | B2 | 5/2014 | Gaensler et al. |
| 8,857,415 | B2 | 10/2014 | Bauer et al. |
| 2002/0104645 | A1 | 8/2002 | Yoshida et al. |
| 2003/0000688 | A1 | 1/2003 | Mathur et al. |
| 2003/0116305 | A1 | 6/2003 | Beddome et al. |
| 2003/0173068 | A1 | 9/2003 | Davies et al. |
| 2004/0069475 | A1 | 4/2004 | Brost et al. |
| 2005/0056411 | A1 | 3/2005 | Dilley et al. |
| 2006/0278377 | A1 | 12/2006 | Martins et al. |
| 2007/0131401 | A1* | 6/2007 | Daly .................. B29C 65/1635 165/158 |
| 2007/0175617 | A1* | 8/2007 | Brost .................. F02B 29/0462 165/149 |
| 2007/0181105 | A1* | 8/2007 | Bazika ................ F02B 29/0462 123/563 |
| 2007/0193732 | A1 | 8/2007 | Oofune et al. |
| 2008/0041570 | A1 | 2/2008 | Abels et al. |
| 2008/0053644 | A1* | 3/2008 | Beetz .................. F02B 29/0462 165/151 |
| 2008/0156472 | A1 | 7/2008 | Maucher et al. |
| 2008/0289804 | A1* | 11/2008 | Baumann .............. F28D 7/1692 165/157 |
| 2009/0014151 | A1 | 1/2009 | Capelle et al. |
| 2009/0056922 | A1* | 3/2009 | Hemminger .............. F28F 9/02 165/158 |
| 2009/0194265 | A1* | 8/2009 | Nakamura ............ F28D 9/0025 165/149 |
| 2010/0071871 | A1 | 3/2010 | Gaensler et al. |
| 2010/0096101 | A1* | 4/2010 | Braun .................. F02B 29/0462 165/41 |
| 2010/0096103 | A1* | 4/2010 | Toda ........................ F28F 1/32 165/47 |
| 2011/0168366 | A1* | 7/2011 | Garret .................. F28D 9/0043 165/148 |
| 2011/0168370 | A1 | 7/2011 | Garret et al. |
| 2012/0210986 | A1 | 8/2012 | Ghiani |
| 2013/0075056 | A1 | 3/2013 | Fernandez |
| 2014/0000569 | A1 | 1/2014 | Eilemann et al. |
| 2014/0041832 | A1 | 2/2014 | Grande Fernandez et al. |
| 2014/0130764 | A1 | 5/2014 | Saumweber et al. |
| 2014/0166253 | A1 | 6/2014 | Odillard et al. |
| 2014/0318120 | A1* | 10/2014 | Svihla ................. F02B 29/0406 60/599 |
| 2015/0068501 | A1 | 3/2015 | Ferlay |
| 2015/0316330 | A1 | 11/2015 | Kenney et al. |
| 2015/0338167 | A1* | 11/2015 | Pomin ..................... F28F 9/001 165/151 |
| 2016/0097596 | A1 | 4/2016 | Stewart et al. |

FOREIGN PATENT DOCUMENTS

| | | |
|---|---|---|
| DE | 102009025282 A1 | 12/2010 |
| EP | 0285504 A1 | 10/1988 |
| EP | 0406774 A1 | 1/1991 |
| EP | 0578916 A2 | 1/1994 |
| EP | 1785609 A1 | 5/2007 |
| EP | 2014892 A1 | 1/2009 |
| FR | 2645209 A1 | 10/1990 |
| FR | 2855605 A1 | 12/2004 |
| JP | 0752637 A | 2/1995 |
| WO | WO 2009156365 A1 | 12/2009 |
| WO | WO 2011/023516 A1 | 3/2011 |

OTHER PUBLICATIONS

English language abstract and machine assisted translation for DE 102009025282 extracted from espacenet.com database on May 5, 2014, 20 pages.
English language abstract and machine assisted translation for EP 0285504 extracted from espacenet.com database on May 5, 2014, 18 pages.
English language abstract and machine assisted translation for EP 0578916 extracted from espacenet.com database on May 5, 2014, 21 pages.
English language abstract for EP 1785609 extracted from espacenet.com database on May 5, 2014, 2 pages.
English language abstract and machine assisted translation for FR 2645209 extracted from espacenet.com database on May 5, 2014, 11 pages.
English language abstract and machine assisted translation for FR 2855605 extracted from espacenet.com database on May 5, 2014, 11 pages.
English language abstract and machine assisted translation for JP 0752637 extracted from espacenet.com database on May 5, 2014, 11 pages.
English language abstract for WO 2009156365 extracted from espacenet.com database on May 5, 2014, 2 pages.
International Search Report for PCT/EP2012/052388, dated Mar. 19, 2012, 7 pages.
International Search Report for PCT/EP2012/002160, dated Oct. 29, 2012, 7 pages.
English language abstract for WO 2011/023516 extracted from espacenet.com database on Mar. 9, 2017, 2 pages.

* cited by examiner

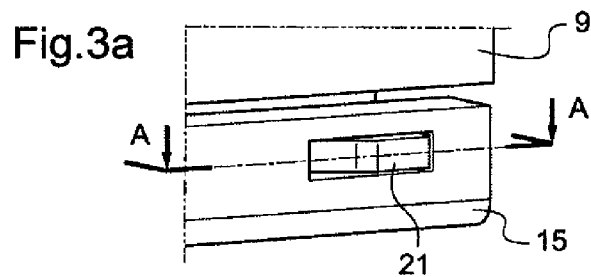
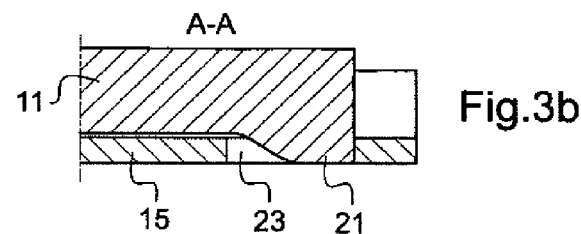
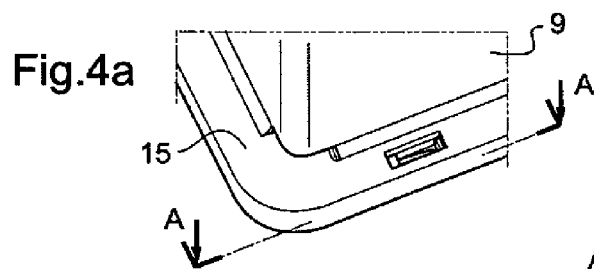
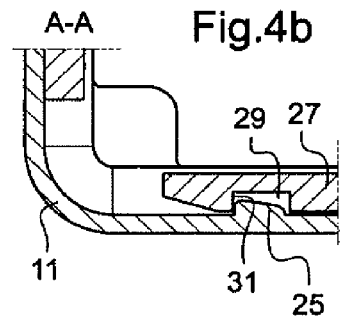
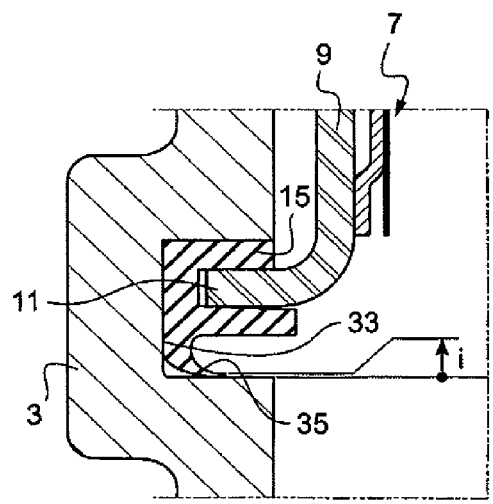

HEAT EXCHANGER, ESPECIALLY FOR A MOTOR VEHICLE, AND CORRESPONDING AIR INTAKE DEVICE

RELATED APPLICATIONS

This application is the National Stage of International Patent Application No. PCT/EP2012/002160, filed on May 21, 2012, which claims priority to and all the advantages of French Patent Application No. FR 11/54578, filed on May 26, 2011, the content of which is incorporated herein by reference.

The invention relates to a heat exchanger, notably for a motor vehicle. The invention also relates to an air intake device comprising such an exchanger.

BACKGROUND

A heat exchanger, for example used in the automobile industry, comprises fluid heat exchange and flow elements in which circulate fluids mutually exchanging heat. The heat exchange elements can, for example, comprise tubes or plates, fins disrupting the circulation of gas and/or fluid flow disrupters, or similar.

Such exchangers used in the automobile domain are known, notably in the field of supercharged heat engines.

In this case, the heat exchanger, also called supercharging air cooler (abbreviated RAS), makes it possible to cool the supercharging air from the engine by heat exchange with another fluid such as the outside air or a liquid such as the water from the engine cooling circuit, thus forming an exchanger of air/air or liquid/air type.

Traditionally, the air is received at an intake manifold, often referred to as such by those skilled in the art.

The manifold is fixed to the cylinder head of the combustion chamber, that is to say to the cylinder inlet. Depending on the engine speed, the air may be cooled, wholly or partly, or not cooled.

According to a known solution, the heat exchanger RAS is received in the manifold and makes it possible to cool the air which passes through it.

To this end, the manifold has an open face allowing for the introduction of the exchanger RAS into it. This opening is subsequently closed by a closing cover.

However, this embodiment can present sealing drawbacks, which can result in poor heat exchange performance levels.

In practice, a poor control of the seal between the bundle of the exchanger and the intake manifold can result in a leak between the bundle and the manifold, and thus lead to a significant drop in performance.

Moreover, the securing of the exchanger in the manifold may not be sufficiently effective.

SUMMARY OF THE INVENTION

The aim of the invention is to propose a heat exchanger offering an improved seal-tightness that makes it possible to optimize the performance levels of the exchanger, while ensuring that the exchanger is effectively secured.

To this end, the subject of the invention is a heat exchanger between at least two fluids, notably for a motor vehicle, comprising:
a heat exchange bundle between said fluids, and
a housing receiving said bundle,
characterized in that said housing has at least one raised edge, and in that said exchanger also comprises a seal made of rigid plastic material, jacketing said at least one raised edge and configured to ensure the seal-tightness between said exchanger and a container of said exchanger.

Said exchanger may also comprise one or more of the following features, taken separately or in combination:
said seal is a lip seal;
said seal is fixed to said at least one raised edge;
said at least one raised edge has first clipping means cooperating with second complementary clipping means borne by said seal;
said seal is made of a rigid plastic material from the family of polyamides;
said housing has a generally substantially "U" shape with three raised edges on one and the same side of said housing, and said seal has a generally substantially "U" shape complementing said raised edges;
said exchanger is configured to cool the supercharging air of an engine in a motor vehicle.

The invention also relates to an air intake device, notably for a motor vehicle, characterized in that it comprises a heat exchanger as defined above as well as an intake manifold receiving said exchanger.

Said device may also comprise one or more of the following features, taken separately or in combination:
said intake manifold has an opening configured for the insertion of said exchanger into said intake manifold and closed by said exchanger by mechanical assembly;
said seal is interposed between said housing of said bundle and said intake manifold;
the function of said seal is, on the one hand, to provide the seal between said exchanger and said intake manifold, and on the other hand to provide mechanical guidance for said exchanger during the assembly of said exchanger with said intake manifold;
said device presents an interference of the order of 0.1 mm to 0.25 mm between said seal and the body of said manifold delimiting a groove for receiving said seal.

BRIEF DESCRIPTION OF THE DRAWINGS

Other features and advantages of the invention will become more clearly apparent on reading the following description, given as an illustrative and nonlimiting example, and the appended drawings in which:

FIG. 3a is a partial cross-sectional view of the exchanger showing a clipping system according to a first production variant, FIG. 3b is a view of the cross section A-A of FIG. 3a, FIG. 4a is a partial cross-sectional view of the exchanger showing a clipping system according to a second production variant, FIG. 4b is a view of the cross section A-A of FIG. 4a, FIG. 5 is a cross-sectional view of the intake device representing the seal received into a groove of the intake manifold.

DETAILED DESCRIPTION

In these figures, substantially identical elements bear the same references.

Figure 1:
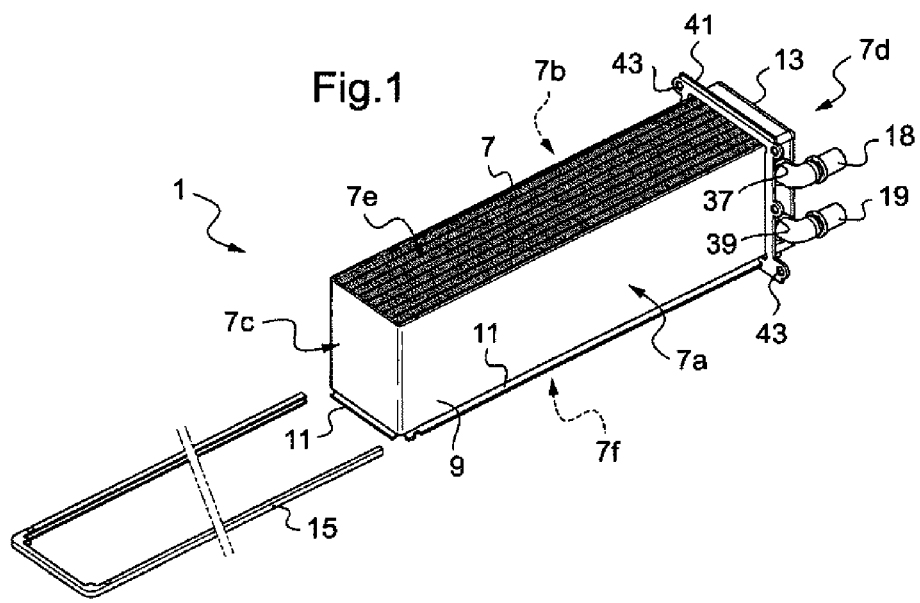
FIG. 1 is a perspective exploded view representing a heat exchanger and a seal of the exchanger.

The invention relates to a heat exchanger. FIG. 1 shows such a heat exchanger designated by the general reference 1.

Such an exchanger 1 can be used in particular to cool the supercharging air for a motor vehicle heat engine.

Figure 2:
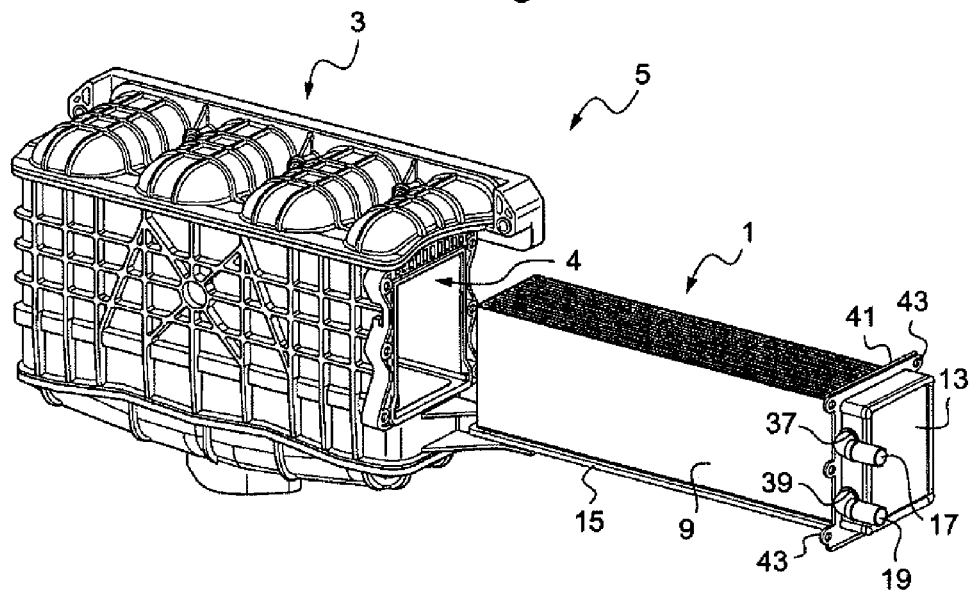
FIG. 2 is an exploded view of an intake device, showing in perspective a heat exchanger and an intake manifold.

In this case, the exchanger 1 can be arranged in an air intake manifold 3, also called feed gas distributor, as illustrated by FIG. 2.

For this, the manifold 3 can have a lateral opening 4 which allows the exchanger 1 to be inserted into it. The assembly can be done by insertion of the exchanger 1 into the manifold 3 via the associated opening 4 of the manifold 3, for example in the longitudinal direction of the exchanger 3.

The manifold 3 is generally mounted on the cylinder head and allows for the intake of supercharging air into the cylinder head.

The air intake manifold 3 and the exchanger 1 received in the manifold 3 form a supercharging air intake device 5.

Moreover, the exchanger 1 can be a so-called "air-water" exchanger, that is to say an exchanger in which the fluids which exchange heat are air and water.

In the case of a supercharging air cooler, the water is preferably water from the so-called "low temperature" cooling circuit of said engine; it is typically water with antifreeze added.

According to the embodiment illustrated in FIG. 1, the exchanger 1 has a generally substantially parallelepipedal form.

This exchanger 1 comprises:
- a heat exchange bundle 7 between a first fluid such as the supercharging air and a second fluid such as the coolant,
- a housing 9 receiving the exchange bundle 7, having raised edges 11,
- a cover 13 for closing the housing 9, and
- a seal 15 made of rigid plastic material jacketing the raised edges 11 of the housing 9.

The Exchange Bundle

According to the embodiment illustrated, the heat exchange bundle 7 has a generally substantially parallelepipedal form with two large lateral faces 7a,7b, two small lateral faces 7c,7d and two end faces 7e,7f.

This bundle 7 can conventionally comprise a stack of plates or of tubes, delimiting first channels for the circulation of the first fluid and second channels for the circulation of the second fluid.

The first fluid passes, for example, through the first channels in the longitudinal direction of the bundle 7 and the second fluid passes, for example, through the second channels transversely from the first end face 7e to the opposite second end face 7f for example.

Disturbing fins can be provided in the first channels, so as to disrupt the flow of the air in these first channels by increasing the exchange surface area. As an alternative or in addition, it is possible to provide turbulators (not represented) for the second fluid circulating in the second channels, so as to improve the heat exchange.

These disturbances make it possible to facilitate the heat exchanges between the air and the water through the walls of the plates or of the tubes.

The exchanger 1 also comprises inlet 17 and outlet 19 nozzles, for the intake of the second fluid into the bundle 7 and the outlet of the second fluid after having circulated in the second channels. These nozzles 17,19 communicate with openings (not represented) provided in the plates or tubes of the bundle 7 to allow for the circulation of the second fluid in the bundle 7.

Housing

As stated previously, the housing 9 receives the exchange bundle 7.

The housing 9 has a form that is open, in the example illustrated, on a small lateral face 7d of the bundle 7.

According to the embodiment illustrated, the bundle 7 being parallelepipedal, the housing 9 has a substantially complementary "U" shape. This "U" shape makes it possible to cover the two large lateral faces 7a,7b and one small lateral face 7c of the bundle 7.

The end faces 7e,7f of the bundle 7 are not covered by the housing 9 to allow for the circulation of the first fluid, such as the supercharging air.

Moreover, in order to allow for the intake of the second fluid into the second channels, the housing 9 has associated orifices (not visible in the figures) communicating respectively with the inlet 17 and outlet 19 nozzles and with the openings provided in the bundle 7.

The housing 9 also comprises one or more raised edges 11 on one and the same side of the housing 9, as illustrated by FIG. 1. These raised edges 11 therefore protrude relative to the general plane defined by the faces of the housing 9.

A seal 15 made of rigid plastic jackets these raised edges 11 as illustrated by FIG. 2.

One example of rigid plastic material that can be cited for the seal 15 is the polyamides such as PA 6 for polycaprolactam, or even PA 6-6 for polyhexamethylene adipamide.

Such a rigid seal 15 participates in the mechanical strength of the exchanger 1 by acting as a stiffener. The seal 15 also acts as a damper.

The raised edges 11 are therefore inserted into the rigid seal 15, for example by sliding in the longitudinal direction of the bundle 7.

In the example illustrated in FIG. 1, the housing 9 is substantially "U" shaped and has three raised edges 11.

The seal 15 therefore has a substantially complementary "U" shape in order to jacket these three raised edges 11.

Once assembled with the raised edges 11, the rigid seal 15 is fixed to these edges 11.

As FIGS. 3a, 3b and 4a, 4b illustrate, the fixing can be done by clipping.

To this end, a clipping system can be provided, comprising first and second complementary clipping means, borne on the one hand by the raised edges 11 of the housing 9 and on the other hand by the rigid seal 15.

The complementary first and second clipping means can, without preference, be borne by the raised edges 11 or by the seal 15.

According to a first variant schematically represented in FIGS. 3a, 3b, a raised edge 11 has a first clipping means such as a clipping tongue 21 and the seal 15 has a second complementary clipping means such as an orifice 23 into which the clipping tongue 21 is inserted.

In this example, the clipping tongue 21 is borne on a lateral wall of the raised edge 11, that is to say on the side of the raised edge 11.

In a complementary manner, the orifice 23 is provided on a lateral wall of the seal 15, that is to say on the side of the seal 15, so as to be located facing the tongue 21 during the assembly of the seal 15 on the raised edge 11.

According to a second production variant schematically represented in FIGS. 4a, 4b, the raised edge has a first clipping means such as a snug 25 and the seal 15 has a second complementary clipping means such as a clipping tab 27.

In this example, the tab 27 has an orifice 29 and an abutment 31; the orifice 29 is placed facing the snug 25 and the abutment 31 bears against the edge of the snug 25 during the assembly of the seal 15 with the raised edge 11.

According to this second variant, the first clipping means is formed on an end wall of the raised edge 11, here on the top of the raised edge 11 with reference to FIGS. 4*a*, 4*b*. The second clipping means is configured to be located facing the first clipping means.

Thus, when the exchanger 1 is inserted into the manifold 3 for example by sliding through the associated opening 4 of the manifold 3 in the longitudinal direction of the bundle 7, the rigid seal 15 fixed to the raised edges 11 of the housing 9 ensures, in addition to its sealing function, a mechanical guiding function for the assembly.

A complementary guiding means can be provided on the manifold 3.

When the exchanger 1 is assembled in the manifold 3, the seal 15 comes into contact with the body of the manifold 3, as can be seen better in FIG. 5.

More specifically, the seal 15 is housed in a groove 33 of the manifold 3. The seal 15 is therefore interposed between the body of the manifold 3 and the raised edges 11 of the housing 9 of the bundle 7.

In addition, the seal 15 is, for example, a lip seal 35.

In the free state, or in the non-compressed state of the lip 35 of the joint 15, a range of values is provided for the interference i between the seal 15 and the body delimiting the groove 33 of the manifold 3. This range of values is determined before compression of the lip 35 of the seal and defines a minimum interference and a maximum interference, making it possible to guarantee the contact between the seal 15 and the body of the manifold when the seal 15 is compressed.

The term "interference" should be understood to mean the value by which the dimensions of the seal 15 exceed the dimensions of the groove 33 receiving the seal 15. In practice, to guarantee the contact between the seal 15 and the body of the manifold 3, the seal 15 exhibits, in the non-compressed state, dimensions greater than the dimensions of the receiving groove 33.

As an example, for a lip seal 15 made of PA6, the minimum interference can be of the order of 0.1 mm and the maximum interference can be of the order of 0.25 mm.

The lip 35, in the example illustrated, therefore exceeds the dimensions of the groove 33 by a value of between 0.1 mm and 0.25 mm.

In the compressed state, the slip seal 15 is therefore always in contact with the body of the manifold 3.

Closing Cover

As specified previously, the exchanger 1 also comprises a lateral closing cover 13 for the housing 9 (see FIGS. 1 and 2).

The cover 13 is therefore assembled facing a lateral face 7*d* of the bundle 7 by closing the opening of the housing 9.

The cover 13 covers the small lateral face 7*d* of the bundle 7 as well as the ends of the housing 9. In this way, the housing 9 is inserted between the bundle 7 and the cover 13.

The cover 13 therefore has a form complementing that of the housing 9. According to the embodiment illustrated with a substantially "U" shaped housing 9, the cover 13 has a generally substantially complementary "U" form.

Furthermore, in the case of an intake device with an exchanger 1 received in a manifold 3, the cover 13 also makes it possible to close the opening 4 of the manifold 3 provided for the insertion of the exchanger 1 into the manifold 3.

The cover 13 therefore participates in the mechanical strength of the bundle 7 of plates or of tubes and of any disturbing elements or turbulators and thus ensures that the exchanger 1 is secured in the air intake manifold 3 or in any other container of the exchanger 1.

Moreover, the inlet 17 and outlet 19 nozzles are fixed to the cover 13. In order to allow the distribution of the second fluid, the cover 13 therefore has, in line with the nozzles 17,19, orifices 37,39 respectively associated with the nozzles 17,19 and a form complementing the form of the nozzles 17,19.

These orifices 37,39 communicate with the associated orifices provided on the housing 9, and with the corresponding openings (not visible in the figures) of the bundle 7 to allow the circulation of the second fluid in the second channels.

Furthermore, the cover 13 can have a folded back peripheral edge 41. This edge 41 is, for example, folded substantially to 90°.

This edge 41 forms, for example, a protrusion relative to the housing 9 and to the bundle 7.

In the case of an intake device 5 comprising such an exchanger 1 received in a manifold 3, the sealing between the exchanger 1 and the manifold 3 can be done on this peripheral edge 41.

To this end, sealing means (not represented) can be provided on the peripheral edge 41.

Furthermore, the lateral closing cover 7 can also have fastening means 43 on the air intake manifold 3 (not represented) for example, which cooperate with complementary fastening means (not represented) borne by the manifold 3.

This fastening can be done for example by brazing, bonding and/or screwing or even clipping.

The fastening means 43 are, in the example illustrated, provided on the peripheral edge 41 of the cover 13 facing a lateral face of the manifold 3 delimiting the opening 4 through which the exchanger 1 is inserted into the manifold 3.

The cover 13 thus ensures both that the exchanger 1 is secured in the manifold 3 and that the exchanger 1 is fastened to the manifold 3.

It will therefore be understood that an exchanger 1 and a corresponding air intake device 5, comprising a rigid seal 15 jacketing the raised edges of the housing 9, make it possible to improve seal-tightness while ensuring the mechanical guiding of the exchanger 1 during its insertion into the air intake manifold 3.

Such a rigid seal 15 therefore makes it possible to guarantee an accurate and repeatable positioning while ensuring the seal-tightness.

The invention claimed is:

1. An air intake device, for a motor vehicle, comprising: a heat exchanger comprising: a heat exchange bundle, and a housing receiving said bundle, wherein said housing has a "U" shape with three separated and raised edges on one and a same side of said housing, and wherein said heat exchanger also comprises a seal made of rigid plastic material having a "U" shape that complements and jackets said three separated and raised edges and is configured to ensure a seal-tightness between said heat exchanger and a container of said heat exchanger, and said air intake device further comprising an air intake manifold receiving said heat exchanger wherein said intake manifold has an opening configured for insertion of said heat exchanger into said intake manifold and closed by said heat exchanger by mechanical assembly, wherein said seal is fixed to said three separated and raised edges, wherein one of said at least three separated and raised edges has a first clipping tongue cooperating with a second complementary clipping tongue borne by said seal.

2. The device according to claim 1, wherein said seal is a lip seal.

3. The device according to claim 1, wherein said seal is made of a rigid plastic material from a family of polyamides.

4. The device according to claim 1, wherein said seal is interposed between said housing of said bundle and said intake manifold.

5. The device according to claim 1, wherein said seal provides a seal between said heat exchanger and said intake manifold, and provides mechanical guidance for said exchanger during assembly of said exchanger with said intake manifold.

6. The device according to claim 1, comprising an interference of the order of 0.1 mm to 0.25 mm between said seal and the body of said manifold delimiting a groove for receiving said seal.

7. The device according to claim 2, wherein said seal is fixed to said three separated and raised edges.

8. The device according to claim 7, wherein one of said at least three separated and raised edges has first clipping means cooperating with second complementary clipping means borne by said seal.

9. The device according to claim 4, wherein said seal provides a seal between said heat exchanger and said intake manifold, and provides mechanical guidance for said heat exchanger during assembly of said exchanger with said intake manifold.

10. An air intake device, for a motor vehicle, comprising: a heat exchanger comprising: a heat exchange bundle, and a housing receiving said bundle, wherein said housing has a "U" shape with three separated and raised edges on one and a same side of said housing, and wherein said heat exchanger also comprises a seal made of rigid plastic material having a "U" shape that complements and jackets said three separated and raised edges and is configured to ensure a seal-tightness between said heat exchanger and a container of said heat exchanger, a lateral closing cover assembled facing a lateral face of said bundle; and an inlet and an outlet, respectively, fixed to said lateral closing cover; said air intake device further comprising an air intake manifold receiving said heat exchanger wherein said intake manifold has an opening configured for insertion of said heat exchanger into said intake manifold and closed by said lateral closing cover, wherein said seal is fixed to said three separated and raised edges, wherein one of said at least three separated and raised edges has a first clipping tongue cooperating with a second complementary clipping tongue borne by said seal.

* * * * *

UNITED STATES PATENT AND TRADEMARK OFFICE
CERTIFICATE OF CORRECTION

Page 1 of 1

PATENT NO. : 9,897,384 B2
APPLICATION NO. : 14/122457
DATED : February 20, 2018
INVENTOR(S) : Laurent Odillard et al.

It is certified that error appears in the above-identified patent and that said Letters Patent is hereby corrected as shown below:

In the Claims

Claim 1, Column 6, Line 65: Please delete "a container of said heat exchanger" and replace with
-- an air intake manifold of said heat exchanger --

Claim 1, Column 6, Line 66: Please delete "said air intake device comprising an" and replace with
-- said --

Signed and Sealed this
Second Day of October, 2018

Andrei Iancu
*Director of the United States Patent and Trademark Office*